July 12, 1966 K. EICKMANN 3,260,479
GUIDED HELICOPTER
Filed May 20, 1964 5 Sheets-Sheet 1
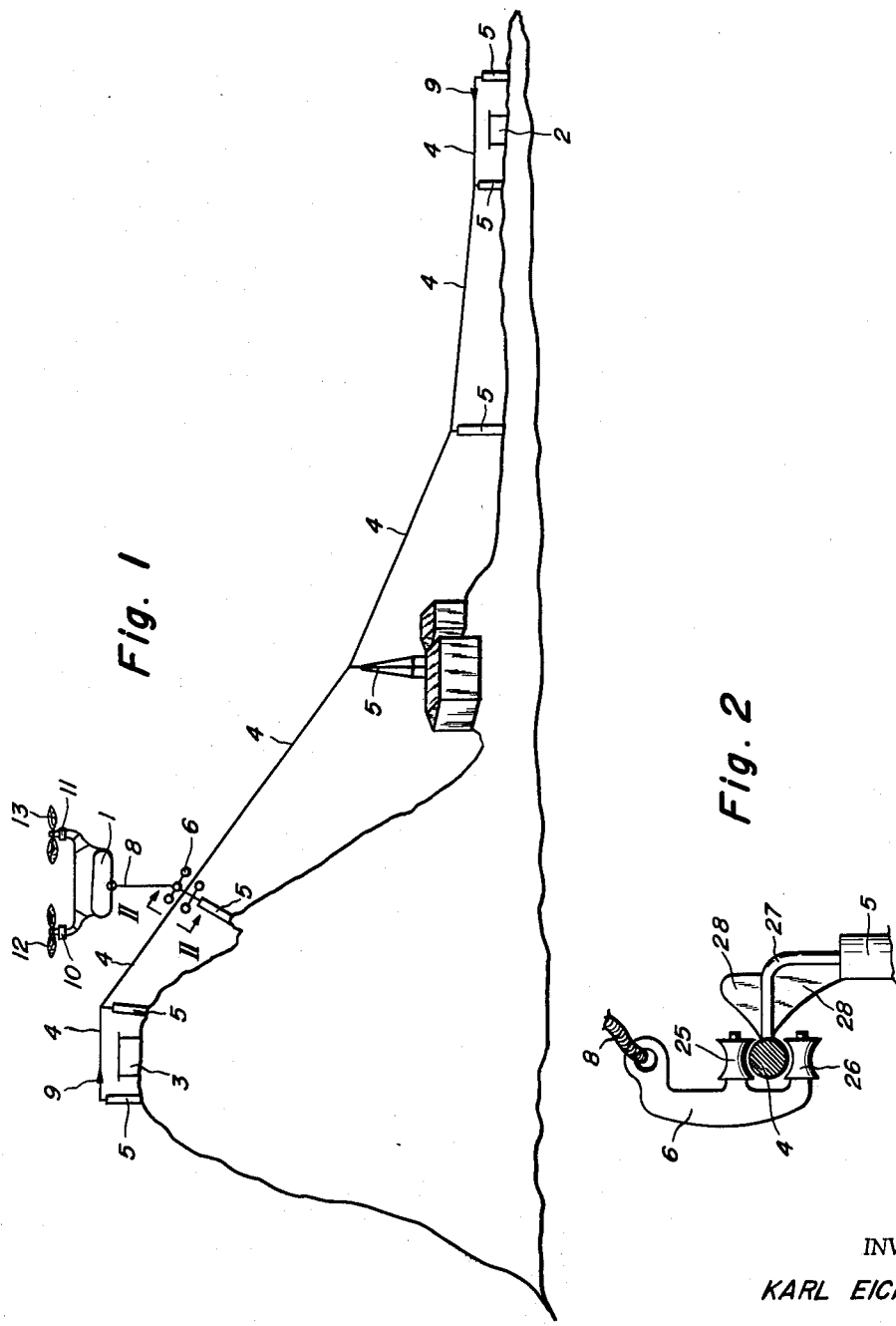
INVENTOR
KARL EICKMANN
BY
ATTORNEYS July 12, 1966 K. EICKMANN 3,260,479
GUIDED HELICOPTER
Filed May 20, 1964 5 Sheets-Sheet 2
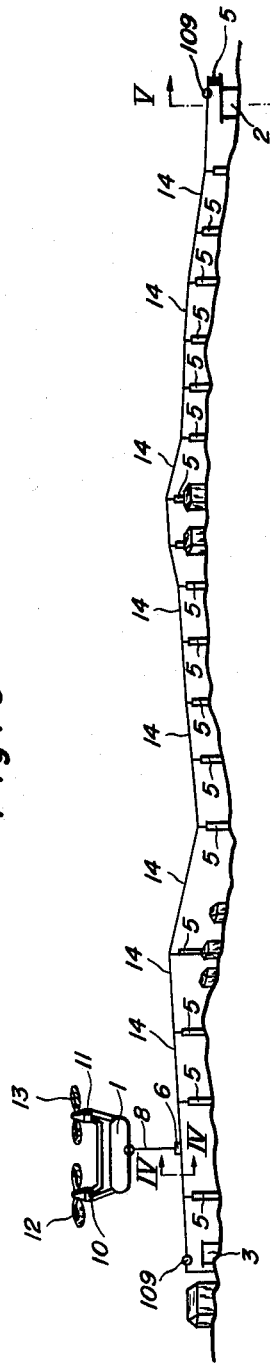
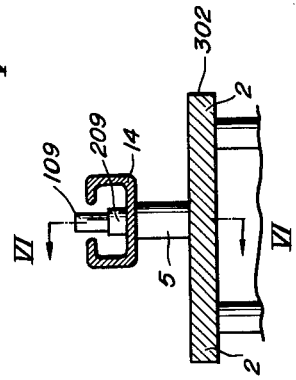
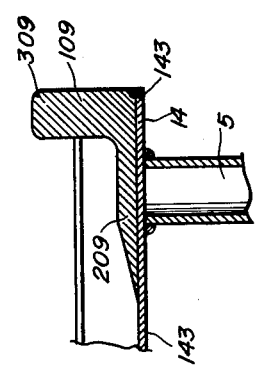
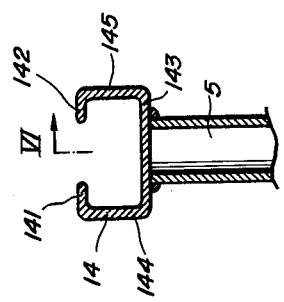
INVENTOR
KARL EICKMANN
BY *McGlew and Toren*
ATTORNEYS

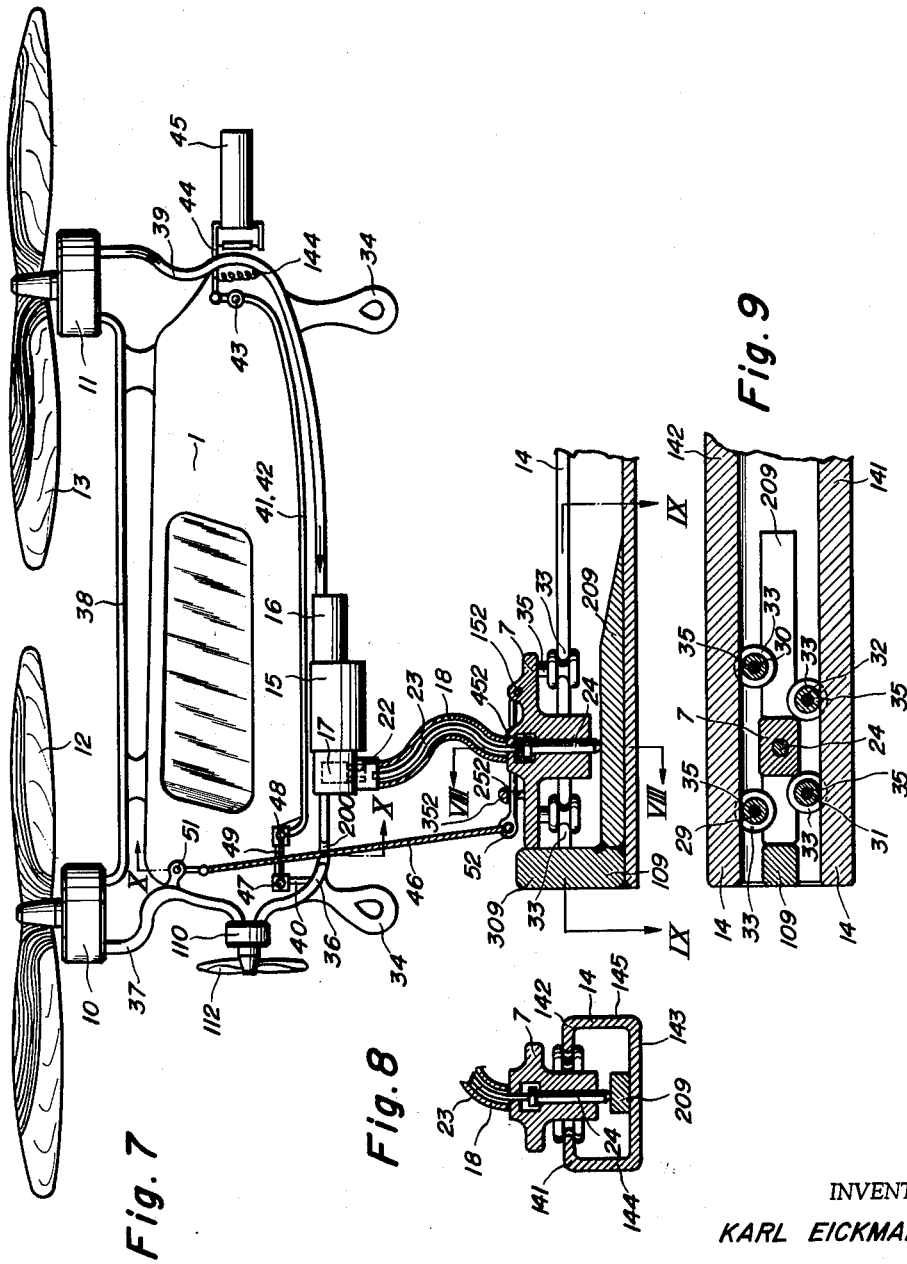

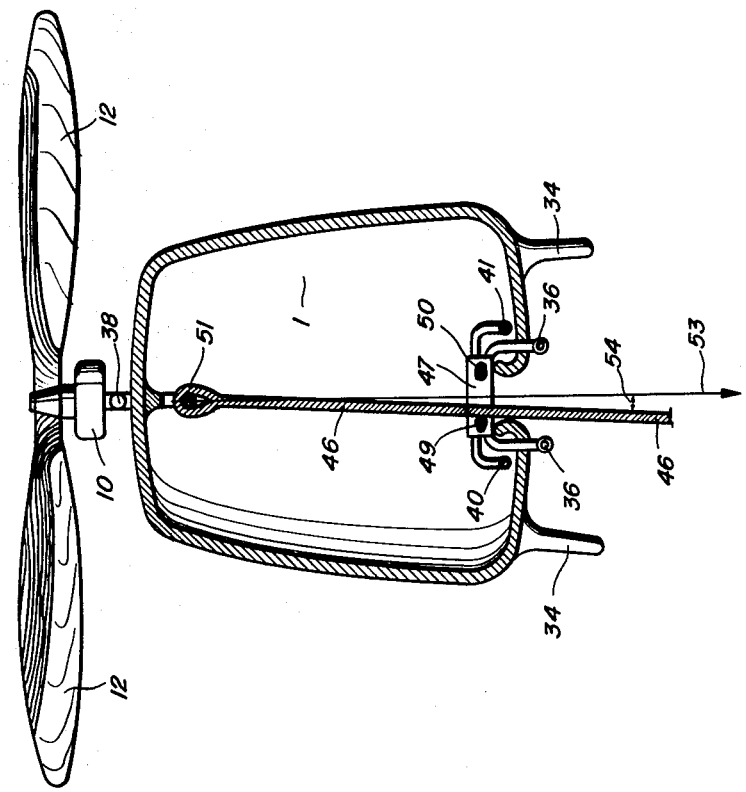

July 12, 1966  K. EICKMANN  3,260,479
GUIDED HELICOPTER
Filed May 20, 1964  5 Sheets-Sheet 5
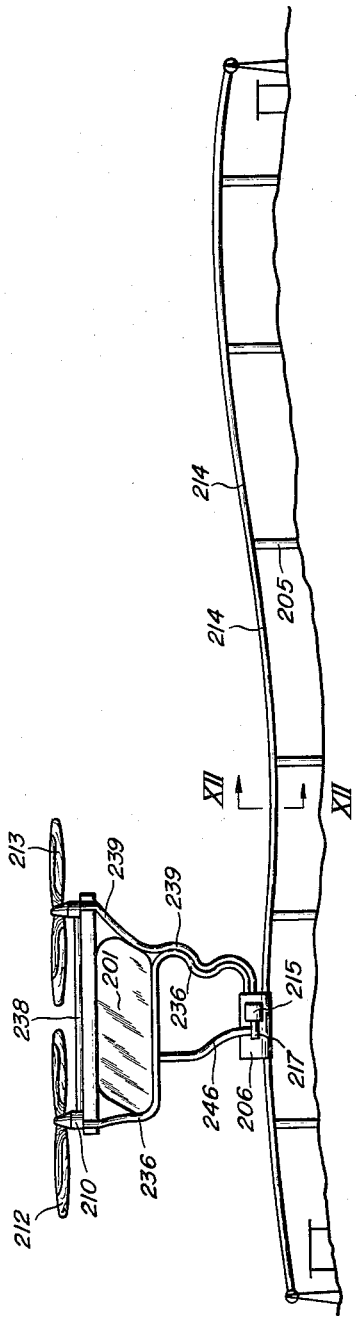
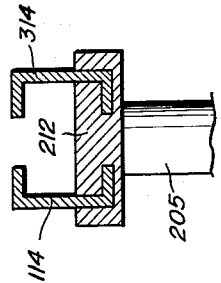
INVENTOR
KARL EICKMANN
BY *McGlew and Toren*
ATTORNEYS United States Patent Office 3,260,479
Patented July 12, 1966

3,260,479
GUIDED HELICOPTER
Karl Eickmann, 2420 Isshiki, Hayama-machi,
Kanagawa-ken, Japan
Filed May 20, 1964, Ser. No. 368,881
17 Claims. (Cl. 244—17.13)

This invention relates, in general, to guidance systems for helicopters and in particular to guidance systems for helicopters which are operated from a removed power source and guided from a starting place to a far distanced landing place.

Still more in detail this invention relates to hydraulically operated helicopters wherein the helicopter is guided by a stationary guide way wherefrom the helicopter is guided by a connection band which might also cause the stopping of the helicopter upon arrival on the desination port, or wherein a signal is transferred to the control means of the hydaulic flow which drives the propellers of the helicopter.

The heretofore used helicopters were commonly operated by a pilot or they were remote controlled by the complicated ground station. Due to this fact, the heretofore used helicopters need large investments for remote control means, or needed the personal work of a pilot to bring the helicopter from the take off to the destination. Due to this large investment of remote control means or due to the requirement for a pilot, the heretofore used helicopters could not reach the maximum usefulness.

However, helicopters could be applied much more in daily work, if they could move automatically, like robots, from a starting place to a destination port without the aid of human beings or of difficult remote control means. For example, such helicopters would be able to transport the mail from one town to another automatically, without necessity of remote control means for controlling the helicopter during the flight from the starting place to the destination.

Another possibility would be to use the helicopters for bringing persons or freight up to mountains or to other difficult areas which would otherwise only be reached by complicated and expensive rope-ways or the like.

It is therefore the purpose of this invention to provide a helicopter which can be controlled from take off to landing, by means of a guide way and connection means and which can run like a robot from the place of departure to the place of destination without the use of control by a pilot or by complicated remote automatic-pilot type control means.

In order to reach this purpose of this invention, a hydraulically driven helicopter is preferred, wherein the power plant produces a flow of hydraulic fluid and wherein this fluid is used to drive hydraulic motors for driving the propellers of the helicopter. Such hydraulically operated helicopters are especially suitable for the guided helicopters of this invention because the flow of hydrofluid created in a fluid flow producing device can easily be varied for controlling the helicopter.

It is therefore the main object of this invention, to provide a hydraulically operated helicopter which is guided by a guide way from a departure place to a destination place.

Another object of this invention is to provide a connection means or band between the guide way and the helicopter.

A still further object of the invention is to provide a stopper means at the destination place, which transfers a stopping command from the stopper place through or along the connection band to the helicopter and reduces the delivery quantity of the fluid flow producing device of the helicopter.

Another object of the invention is to provide guide shoes for running along or running on the guide way.

Another object of the invention is to provide guide ways which are inexpensive in production and in construction.

A still further object of this invention is to provide automatically operating control means on the helicopter for orienting the helicopter substantially in the position above the guide way and for correcting any tendency toward lateral or forward migration.

It is still a further object of this invention to provide a guided helicopter, wherein the power plant and/or the fluid flow producing device or the power plant and the pump are provided in or on the guide shoe, which runs on the guide way of this invention. The power plant is advantageously an electric motor and the guide way advantageously include means for conducting or storing electrical energy for driving electrical power plants in the guide shoe or in the helicopter of this invention.

And it is another object of this invention to provide a stopper at the destination place which acts directly or indirectly on the delivery adjustment of a fluid flow producing device or power supply in the helicopter.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 shows a helicopter and helicopter guidance system operating over a long distance.

FIG. 2 is an enlarged section through FIG. 1 taken along the line II—II.

FIG. 3 shows another embodiment of a guidance system and helicopter which is applicable for the transport of mail or freight from one departure place to a destination place, for example, from one post office to another post office.

FIG. 4 is a section taken along the line IV—IV of FIG. 3.

FIG. 5 is a section taken along the line V—V of FIG. 3.

FIG. 6 is a longitudinal section taken along line VI—VI of FIG. 5.

FIG. 7 is a longitudinal sectional view of a helicopter constructed in accordance with this invention, wherein the connection band and the guide shoe and guide way are shown in longiutdinal sectional view.

FIG. 8 is a cross sectional view through FIG. 7 taken along the line VIII—VIII.

FIG. 9 is a cross sectional view through FIG. 7 along the line IX—IX.

FIG. 10 is a longitudinal sectional view through FIG. 7 taken along the line X—X.

FIG. 11 represents another embodiment of the invention in a longitudinal view from a far distance.

FIG. 12 is a cross sectional view through FIG. 11 taken along the line XII—XII.

Referring now to the figures, numeral 1 represents the helicopter or the cabin or body of the helicopter. Reference numeral 2 indicates a first port, e.g. a departure port, while position 3 shows another port, for instance, a destination port, which is located in FIG. 1, for example, on top of a mountain. The guideway 4 extends from port 2 to port 3, destination ports or departure ports. The guide way 4 is supported on the guide way booms 5 which are anchored at fixed intervals along the landscape and may be tops of houses, church steeples, other towers and the like.

The guide way 4 of the embodiment of FIG. 1 is, for example, a wire fastened on a wire keeper 27 is borne by the guide way booms 5. In the neighbourhood of the respective guide way booms 5, there are guide wings 28 which prevent the guide shoe from running against the guide way boom 5 or against the wire keeper 27. The guide wings 28 are inclined so, that, if the guide shoe passes along them the guide shoe 6 will always be corrected into a substantially vertical position. The guide shoe 6 includes two guide shoe rollers 25 and 26 which are fastened on the respective bearings of the guide shoe 6 and which run along the guide way 4. The guide shoe rollers 25 and 26 may, for this purpose, have an outer configuration which corresponds substantially oppositional to the outer configuration of the respective guide way 4 and the guide shoe rollers 25 and 26 may be so distanced from each other that they are embracing with a part of their outer surface, the guide way 4.

A connecting band 8 extends from the guide shoe 6 to the helicopter 1.

Helicopter 1 is driven, for example, by motors 10 and 11 which drive propellers 12 and 13. But the helicopter could also be driven by one propeller only or by a plurality of motors or propellers depending on the actual design and situation.

The helicopter may be started at the departure port 2. As soon as the propellers of the helicopter revolve with enough speed to cause the helicopter to move upwardly and forwardly the helicopter runs along above the guide way 4 from the departure place 2 until it reaches finally its destination place 3. Thereby, during this travel the helicopter is fastened by connecting band 8 on guide shoe 2, so that the helicopter 1 cannot depart from guide shoe 6. Guide shoe 6, on the other hand, runs along the guide way 4 and cannot fall away from the guide way 4, because the rollers 25 and 26 of guide shoe 6 embrace the guide way 4. Thereby, the helicopter 1 is securely guided by guide way 4 during its travel from departure port 2 to the destination port 3. It is not necessary with the guide that a pilot be present on board the helicopter 1. On the contrary, the helicopter 1 can run alone and automatically from the departue port 2 to the destination port 3.

This is especially convenient for transporting passengers as well as freight, mail or the like, from one port to another.

At the destination port 3, a stopper 9 provided on the guide way which 4 stops the guide shoe 6 from further movement. Thereby, the helicopter 1 comes to a stop on the destination place 3. As soon as this stop is reached, the service personnel on the destination port 3 may slow down the propeller speed of helicopter 1 and thereby control the helicopter 1 for a safe landing on the destination port 3.

But it would also be possible to transfer a signal from the stopper 9 to the power plant or to the driving mechanism of helicopter 1, so that helicopter 1 automatically lands on the destination port 3.

Instead of travelling from departure port 2 to destination port 3, it is also possible to send the helicopter from destinaiton port 3 back to departure port 2. In such a case, port 3 becomes the departure port while port 2 becomes the destination port. Port 2 has therefore also a stopper 9, so that on arrival at the destination port, the helicopter again would be stopped and can be set for landing or lands itself.

In FIG. 3, another embodiment of the invention, guide way 14 extends from a departure port 2 to destination port 3. Again, the departure and destination ports can be reversed. Guide way 14 is also borne on guide way booms 5 planted on the landscape. The embodiment of FIG. 3 is especially suitable for quick transportation of mail from one town to another by means of the automatically guided helicopter of this invention.

Helicopter 1 is guided again by guide shoe 6, which runs along the guide way 14, and helicopter 1 is fastened to guide shoe 6 by tracting band 8. Helicopter 1 may be operated by similar motors 10 and 11 and propellers 12 and 13 or another number of motors and propellers.

As will be seen from FIG. 4, the guide way 14 has a double U-shaped section including a bottom 143, guide way side plates 144 and 145 and upper transversal plates 141 and 142.

Stoppers 109 are provided on or within the guide way 14 at each port 2 and 3.

In FIG. 6, one end of the guide way 14 is demonstrated. It can be seen therefrom that the guide way 14 is fastened with its guide way bottom 143 on the respective guide way boom 5. A stopper 109 is fastened on the guide way bottom 143 and extends upwardly beyond the guide way transversal plates 141 and 142. The stopper 109 is provided with a stopper inclination 209. Stopper 109 serves to stop the guide shoe 6 adjacent the end of the guide way 14. The stopper inclination 209 is provided in order to provide impulses (for example, mechanical or electrical controls) for the control of the helicopter 1.

FIG. 5 shows a section through the guide way 14 as well as through the departure or destination port 2. Platform 302 is a part of the departure or destination port 2 wherein or whereon the helicopter can rest. The guide way boom 5 is mounted on top of the platform 302 at port 2.

In FIG. 7 the helicopter 1 is driven by a power plant 15 which drives a hydraulic pump 17 which is of variable displacement and which is provided with a pump delivery quantity adjustment device 22. The pump provides the flow of fluid under pressure which passes from pump 17 through the delivery tube 36 to a first hydraulic motor 110. Hydraulic motor 110 drives a propeller 112 in directions for forward and backward movement. The flow of fluid leaves hydraulic motor 110 through the fluid passage 37 and passes therethrough into the hydraulic motor 10. Hydraulic motor 10 is revolved by the flow of fluid therethrough and thereby provides the rotation of the first propeller 112. Thereafter, the hydraulic fluid under medial pressure is directed to the hydraulic motor 10 to rotate propeller 12 and through the medial passage 38 to the second hydraulic motor 11 which drives the second propeller 13. Thereafter, the fluid leaves hydraulic motor 11, and flows through the return passage 39 back to a tank, or into the power plant 15 or pump 17 of the helicopter.

Helicopter 1 is also provided with a body 1, wherein the freight might be loaded or wherein passengers may be seated. Helicopter 1 has also the helicopter feet 34, with which it can rest on the ground or on a platform at the respective ports. The helicopter body may be fastened on the passage or pipes or motors or therebetween, by respective fastening means.

From the fluid flow producing device or power plant 15 or pump 17, another flow of fluid or a part of a flow of fluid or a split flow, out of the fluid passage 36 or delivery passage 36, passes through respective pipe or tubes or passages 40, to control valves 47 and 48. Control valves 47 and 48 are provided with control valve bars 49 and 50 which connect both control valves 47 and 48 with each other and which can be seen in the sectional view of FIG.

10. From the control valves 47 and 48 fluid passages 41 and 42, respectively connect into the hydraulic motor or hydraulic cylinder 43. The hydraulic motor or cylinder 43, operates the transmission means 44 which operates the inclination or leftwards or rightwards movement of a control wing 45.

The tracting means of tracting band 46 is fastened in the upper part of a helicopter, on the tracting band seat 51 and extends therefrom through the space between the control valves 47 and 48 and control valve bars 49 and 50 and thereafter through a respective hole 200 in the bottom of the helicopter to the tracting band seat 52 of the guide way 7. The tracting band seat 52 is fastened on the guide way 7 and more in detail, it is fastened in such a way that it can swing around a bearing 152 and that it can swing upwards or downwards within a respective recess or hole 252 of guide shoe 7. The recess 252 is enclosed in upward direction in this embodiment by the tracting band seat stopper 352. The tracting band seat 52 is in this example of the embodiment of the invention, therefore able to swing around the bearing 152 within the recess 252 in a limited extent and is topped from further upward movement by the tracting band stopper 352. The tracting band seat 52 is also connected by a respective connection means 452 to the transmission finger 24 of guide shoe 7. Therefore if the tracting band seat 52 moves upwards or downwards, then also the transmission finger 24 of guide shoe 7 moves to a limited extent upwardly or downwardly.

The helicopter 1 is therefore fastened to guide shoe 7 by the flexible tracting means or tracting band 46. Helicopter 1 cannot depart more or further from guide shoe 7 than the length of the tracting means or flexible tracting means 46.

A control connection or hose 18 extends from guide shoe 7 to the pump delivery quantity adjustment device 22.

A control wire 23 is located within the control wire hose 18 and extends therethrough and is connected between the transmission finger 24 of guide shoe 7 and the pump delivery quantity adjustment device 22. Therefore, if the transmission finger 24 moves upwardly, then the pump delivery quantity adjustment device 22 also moves upwardly, thereby reducing the delivery quantity which is produced in the hydraulic pump means 17. If the transmission finger 24 moves into its maximum downwards position, then the pump delivery quantity adjustment device 22 moves to a position wherein the fluid flow producing device or pumping means 17 produces the maximum power and the maximum delivery quantity of fluid.

During the travel between the departure port and the destination port, the transmission finger is moved into its lowermost position, either by its own weight or by spring means in the guide shoe 7, which act on the transmission finger 24.

If the helicopter enters the respective destination port 2 or 3, then the transmision finger 24 moves upwardly on inclination 209 until it gradually reaches its highest position. When the guide shoe 7 runs against the extending part 309 of the stopper 109. Thereby, the guide shoe 7 is prevented from any further movement beyond the stopper 109 and the transmission finger is moved into its uppermost position 24. The upward movement of transmission finger 24 causes the flow delivery quantity adjustment device of the pump to lower the delivery quantity. Due to the lowering in the quantity of the flow of fluid, the speed of the hydraulic motor decreases and also the speed of the propellers decreases, so that the helicopter automatically lowers a safe landing on the platform 302 of the destination port 2 or 3. The inclination 209 is such that the slowing down of the delivery quantity of hydraulic fluid is gradual and insures a smooth landing of the helicopter at the destination port.

On reaching the destination port, the helicopter can be reversed for travel from the former destination port to the former departure port. Therefore, also the other ports are preferably provided with respective stopper means as shown in FIGS. 6 and 5.

In FIG. 8, the transmission finger 24 is shown in more detail. FIG. 9 is also provided as a sectional view through FIG. 7 in order to show guide shoe 7 in a cross-section and transmission finger 24 in a cross-section as well as the respective guide shoe rollers and the stopper 109. The guide shoe rollers 29, 30, 31 and 32 are fastened on respective guide shoe bearings 25 of guide shoe 7 and the guide shoe rollers 29 to 32 have respective ring grooves or ring recesses 33 through its outer surface. The ring recesses 33 bear against the respective guide way transveral plates 141 or 142 so that the guide shoe rollers 29 to 32 can run along the respective guide way transversal plates 141 or 142. The upper or lower wall, which extends beyond the recess 33 of the respective rollers 29 and 30, embrace the respective guide way transversal plate 141 on its upper and downwards face, while the respective end parts which extend beyond the recesses 33 of the guide shoe rollers 31 and 32 embrace the guide way transversal plate 142 upwards and downwards.

The guide shoe roller bearings 35 are arranged so that the guide shoe rollers 29 and 30 are pressed with the bottom of the ring recess 33 against the end face of the guide way transversal face 141 while the faces of the bottom of the ring recesses 33 of the guide shoe rollers 31 and 32 are pressed or substantially adapted against the end face of the guide way transversal face 142. Thereby, the guide shoe 7 can travel along the guide way 14 between the guide way transversal plates 141 and 142. The guide shoe 7 is entirely kept between the guide way transversal plates 141 and 142 and cannot leave the guide way 14 either upwardly or downwardly. It can also not pass beyond the guide way 14 because the guide shoe 7 is stopped at the ends of the guide way 14 by the respective stoppers 109.

If the helicopter of this embodiment of the invention enters into the respective destination port, then the stopper inclination 209 pushes the transmission finger 24 into its upwards position. This upward position of transmission finger 24 is transferred by the control wire 23 through control wire hose 18 to the adjustment device of the pump means or fluid flow producing device 17 and slows down the delivery quantity of the flow of fluid and slows thereby the revolution of the respective hydraulic motors and of the propellers so that the helicopter automatically starts lowering for landing and sets down on the respective platform 302 of the destination port. Thereafter, the passengers can leave the cabin of the helicopter 1 or the freight can be disloaded from the helicopter 1 and the helicopter can be thereafter sent back to the earlier departure port.

This helicopter is therefore especially convenient for the automatic transportation of passengers or freight, for instance, for the transportation of mail from one post office in one town to another post office in another town.

If, due to sidewards winds or due to other circumstances, the helicopter 1 moves during travel from the departure port to the destination port laterally away from the guide way 14, then the tracting band 46 inclines by a tracting means inclination angle 54 substantially to the gravity resultant or the normal to the earth surface which is presented by position 53 in FIG. 10. If the helicopter moves more then a very small amount sidewards from the location substantially above the guide way 14, then the tracting means inclination angle 54 reaches a certain amount until the tracting band 64 moves against the respective control valve bar 49 or 50. Then the tracting band 46 pushes against the respective control valve bar 49 or 50. Then the control valve bar 49 or 50 moves a control means in the control valve 47 or 48 and thereby the controller 47 or 48 passes a respective quantity of flow of fluid out from the delivery tube 34 or another delivery tube 47 or 48 and the amount of fluid which is passed by this control means flows either through the fluid passage 40 or through the fluid passage 41 into the already mentioned control motor or control cylinder 43.

The quantity of flow of fluid which is passed into the control motor 43 moves a part of the control motor or cylinder, for instance, the shaft or piston of it and this shaft then moves the transmission means 43, 44 to incline the sidewards control wing 55 either to the left or right. The sidewards control wing 45 is located in the flow of air or in the air stream which flows respectively around the helicopter 1 or is located in the air stream which is produced by propeller 112. Therefore, due to the movement of the inclination of the sidewards control wing 49, the helicopter moves either leftwards or rightwards until it reaches again a position substantially above the guide way 14. As soon as this position is reached, the tracting band 46 moves again into its middle position; the tracting means inclination angle 54 becomes about zero and the control bar 49 or 50 moves back into neutral position. The control wing 45 moves back again into its neutral position and is held there by spring means 144. The shaft of the control motor or control cylinder 43 is also moved into its neutral position.

Therefore, the helicopter, during the whole travel from the departure port to the destination port, remains substantially above the guide way 14. It is for this purpose, necessary, that the weight be centered below the upward tracting center point of the helicopter so that the helicopter maintains itself in a substantial vertical position during its travel through the air.

In FIGS. 11 and 12 another embodiment of this invention is shown. In this case, inside of guide shoe 207 is a power plant 215 located which drives a pump 217. The guide way 214 is therefore more strong and so are the guide booms 205. They must be sufficiently strong to bear a respective guide shoe 207 with a power plant either in or on it.

The helicopter 1 is fastened by fastening band 246 on the guide shoe 206. However, the flow of fluid which is produced in the fluid flow producing device or pump means 217 is passed through the respective delivery tube or delivery passage 236 to the helicopter and enters the hydraulic motor 210 for revolving the propeller 214 and flows thereafter out of hydraulic motor 210 through the medial pipe or medial passage 238 to the other hydraulic motor 211 for revolving the other propeller 213. The flow of fluid leaves the hydraulic motor 211 through the return passage 239 for entering into a respective tank or for entering the pump or fluid flow producing device inside of the guide shoe 206.

The feature of this embodiment is, that the fluid flow producing device or the power plant is directly located on or in the guide shoe 206 so that the weight of the helicopter is less and that the helicopter 201 is able to transport a greater load. Due to another embodiment of this part of the invention the power plant 215 might be a combustion engine, turbine or the like or an atomic engine or also, for example, an electric motor.

If the power plant 215 is an electric motor, then the guide way 214 is preferably provided with guide shoe U-bars 114 and 314. One of the guide shoe U-bars 114 or 314 is then supplied with current so that the current can be passed from the respective guide way U-bar to the electric motor. The other guide way U-bars 414 or 314 may also be connected to an electric power supply to operate electric motor 215 during the travel of its guide shoe 206 through U-bars 314 and 414.

The guided helicopter of the invention can be surely guided from a departure place to a desired destination place, either by pilots or automatically. In the embodiments illustrated and described in this specification, the helicopter was hydraulically operated. But instead of driving the propellers by hydraulic motors the propellers might also be driven by other rotation means.

One of the features of this invention is, that the helicopter can be automatically guided from one place to another, or from one port to another, or that it can be automatically stopped at the destination port as well as it can be automatically corrected for movement above the guide way, if the helicopter has considerably moved sidewards from the position above the guide way.

Another feature is, that the helicopter itself is of a very simple design and can be inexpensively built and operated. Another important feature of the invention is, that the guide ways of the helicopter can be very simple and inexpensively built and maintained. Helicopters of this invention are therefore much less expensive than high cost cable cars or the like and helicopters of the invention are less expensive to operate and maintain then conventional helicopters.

The helicopters of this invention can also be built in very small sizes especially for the quick transportation and automatic transportation of mail, passengers, small freights and the like, from one place to another.

An important feature of the invention is moreover, that the guide ways are so simple that they can be easily built and installed and very simple and light guide way booms 205 can be used.

Additionally, the variable pump means or fluid flow producing means makes it possible to adjust the pump at its departure place to such a delivery quantity that the helicopter just floats over the highway with only a relatively small tracting force inside of the respective tracting band. The friction between the rollers and roller bearings between the guide shoes can thereby be kept in a small limit and also the strength of the parts of the guide way booms can thereby be kept in a relative light construction and with relatively small stability.

The embodiments demonstrated in this specification show some examples of this invention only. It is possible to combine one embodiment with others of the invention or to combine the embodiments of this invention with conventional known means. It is also possible to make changes in the design and in the structure of the embodiments of this invention without leaving the scope of this invention. It is therefore desired that the patent shall not be limited to the embodiments demonstrated in this specification and the description thereof, but that the invention shall be protected and defined by the appended claims.

Having thus fully described my invention, what I claim is:

1. A helicopter guiding system comprising, means defining a guide way adapted to be supported on the ground, a helicopter including a loading body and at least one lift rotor rotatably mounted on said loading body, a guide member defined on said guide way for movement therealong, a connector connected between said guide member and said helicopter and confining said helicopter for operation over said guide way within the length range of said connector, and power means connected to said lift rotor for rotating said lift rotor to raise and lower said helicopter in respect to said guide member within a limiting range of the length of said connector.

2. A helicopter guiding system comprising, means defining a guide way adapted to be supported on the ground, said guide way having defined port stops at spaced locations along the length thereof, a helicopter including a loading body and at least one lift rotor rotatably mounted on said loading body, a guide member confined on said guide way for movement therealong, a connector connected between said guide member and said helicopter and confining said helicopter for operation over said guide way within the length range of said connector, power means connected to said lift rotor for rotating said lift rotor to raise and lower said helicopter in respect to said guide member within a limiting range of the length of said connector, and control means located adjacent at least one of said stops and connected to said power means for automatically changing the speed of said lift rotor to effect raising and lowering said helicopter.

3. A helicopter guiding system, according to claim 2, including means at said ports for stopping said guide member.

4. A helicopter guiding system comprising, means defining a guide way adapted to be supported on the ground, a helicopter including a loading body and at least one lift rotor rotatably mounted on said loading body, a guide member confined on said guide way for movement therealong, a connector connected between said guide member and said helcopter and confining said helicopter for operation over said guide way within the length range of said connector, power means connected to said lift rotor for rotating said lift rotor at selected speeds for raising and lowering said helicopter in respect to said guide member within a limiting range of the length of said connector, said power means including fluid flow producing means, a fluid motor connected to said lift rotor for rotating said rotor and fluid conduit means connected between said fluid flow producing means and said fluid motor for directing fluid to said fluid motor to rotate said rotor.

5. A helicopter guiding system comprising, means defining a guide way adapted to be supported on the ground, a helicopter including a loading body and at least one lift rotor rotatably mounted on said loading body, a guide member confined on said guide way for movement therealong, a connector connected between said guide member and said helicopter and confining said helicopter for operation over said guide way within the length range of said connector fluid flow producing means carried on said guide member connected to said lift rotor for rotating said lift rotor to raise and lower said helicopter in respect to said guide member within a range of the length of said connector, a fluid motor connected to said lift rotor, and fluid conduit means between said fluid flow producing means and said fluid motor for directing fluid to said fluid motor to rotate said lift rotor.

6. A helicopter guiding system comprising, means defining a guide way adapted to be supported on the ground, a helicopter including a loading body and at least one lift rotor rotatably mounted on said loading body, a guide member confined on said guide way for movement therealong, a connector connected between said guide member and said helicopter and confining said helicopter for operation in respect to said guide way within the length range of said connector, and power means connected to said lift rotor for rotating said lift rotor to raise and lower said helicopter in respect to said guide member within a limiting range of the length of said connector, and to lower said helicopter, said power means including fluid flow producing means, a fluid motor connected to said lift rotor and fluid conduit means between said fluid flow producing means and said fluid motor for directing fluid to said fluid motor to rotate said lift rotor, said power means being carried by said helicopter loading body.

7. A helicopter guiding system comprising, means defining a guide way adapted to be supported on the ground, a helicopter including a loading body and at least one lift rotor rotatably mounted on said loading body, a guide member confined on said guide way for movement therealong, a connector connected between said guide member and said helicopter and confining said helicopter for operation over said guide way within the length range of said connector, and power means connected to said lift rotor for rotating said lift rotor to raise and lower said helicopter in respect to said guide member within a limiting range of the length of said connector, said guideway including supporting poles anchored in the ground and a guide cable suspended from said poles, said connector comprising a guide shoe which is movable over said cable.

8. A helicopter guiding system, according to claim 7, wherein said guide shoe includes first and second roller elements engaged on opposite sides of said cable, and means rotatably supporting said elements and confining said guide shoe in association with said cable.

9. A helicopter guiding system comprising, means defining a guide way adapted to be supported on the ground, a helicopter including a loading body and at least one lift rotor rotatably mounted on said loading body, a guide member confined on said guide way for movement therealong, a connector connected between said guide member and said helicopter and confining said helicopter for operation over said guide way within the length range of said connector, and power means connected to said lift rotor for rotating said lift rotor to raise and lower said helicopter in respect to said guide member within a limiting range of the length of said connector, said guide way including a channel-shaped member having at least one port stop defined thereon including an inclined control portion and a vertical stop portion, said connector including an element confined in said channel member and control means carried by said element and connected to said power means including an element adapted to ride up on the inclined portion to reduce the power supply to said lift rotor, said vertical element acting to stop said guide member.

10. A helicopter guiding system, according to claim 9, including a platform supported above ground level, said connector permitting said helicopter to land on said platform when said lift rotor speed is reduced.

11. A helicopter guiding system comprising, means defining a guide way adapted to be supported on the ground, a helicopter including a loading body and at least one lift rotor rotatably mounted on said loading body, a guide member confined on said guide way for movement therealong, a connector connected between said guide member and said helicopter and confining said helicopter for operation over said guide way within the length range of said connector, and power means connected to said lift rotor for rotating said lift rotor to raise and lower said helicopter in respect to said guide member within a limiting range of the length of said connector, at least one horizontal propulsion propeller rotatably supported on said helicopter body for rotation about a substantially horizontal axis, said power means being connected to said propeller for rotating said propeller.

12. A helicopter guiding system comprising, means defining a guideway adapted to be supported on the ground, a helicopter including a loading body and at least one lift rotor rotatably mounted on said loading body, a guide member confined on said guide way for movement therealong, a connector connected between said guide member and said helicopter and confining said helicopter for operation over said guide way within the length range of said connector, and power means connected to said lift rotor for rotating said lift rotor to raise and lower the helicopter in respect to said guide member within a limiting range of the length of said connector, at least one horizontal propulsion propeller rotatably supported on said helicopter for rotation about a substantially horizontal axis, said power means being connected to said rotor for rotating said rotor, said power means including flow producing means, a fluid motor connected to said lift rotor to rotate said lift rotor, a second fluid motor connected to said propeller to rotate said propeller and fluid conduit means connected between said flow producing means, said second fluid motor and said first fluid motor.

13. A helicopter guiding system comprising, means defining a guide way adapted to be supported on the ground, a helicopter including a loading body and at least one lift rotor rotatably mounted on said loading body, a guide member confined on said guide way for movement therealong, a connector connected between said guide member and said helicopter and confining said helicopter for operation over said guide way within the length range of said connector, and power means connected to said lift rotor for rotating said lift rotor to raise and lower said helicopter in respect to said guide member within a limiting range of the length of said connector, at least one horizontal propulsion propeller rotatably supported on said helicopter for rotation about a substantially horizontal axis, said power means being connected to said rotor for rotating said rotor, said power means including flow producing means, a fluid motor connected to said lift rotor to rotate said lift rotor, a second fluid motor connected to said propeller to rotate said propeller and fluid conduit means connected between said flow producing means, said second fluid motor and said first fluid motor, a control wing pivotally mounted on said helicopter and projecting outwardly from said body into the airstream, and attitude control means disposed around said connector and movable by displacement of said connector when said helicopter migrates out of alignment with said guide member to actuate said control wing for correcting the attitude of said helicopter.

14. A helicopter guiding system comprising, means defining a guide way adapted to be supported on the ground, a helicopter comprising a helicopter loading body, first and second lift rotors rotatably mounted for rotation about substantially vertical axes at spaced locations on said helicopter body, at least one horizontal propulsion propeller rotatably mounted on said body for rotation about a substantially horizontal axis, a first fluid motor connected to said propeller for rotating said propeller, a second fluid motor connected to said first lift rotor for rotating said first lift rotor, a third fluid motor connected to said second lift rotor for rotating said second lift rotor, fluid flow producing means connected to said first, second and third rotors for supplying fluid to said rotor under pressure to rotate said propeller, said first lift rotor and said second lift rotor, a guide member confined on said guide way for movement therealong, and a connector between said guide member and said helicopter of a length sufficient to permit said helicopter to be raised above said guide member and lowered downwardly for loading purposes.

15. A helicopter guiding system comprising, means defining a guide way adapted to be supported on the ground, a helicopter comprising a helicopter loading body, first and second lift rotors rotatably mounted for rotation about substantially vertical axes at spaced locations on said helicopter body, at least one horizontal propulsion propeller rotatably mounted on said body for rotation about a substantially horizontal axis, a first fluid motor connected to said propeller for rotating said propeller, a second fluid motor connected to said first lift rotor for rotating said lift rotor, a third fluid motor connected to said second lift rotor for rotating said second lift rotor, fluid flow producing means connected to said first, second and third rotors in a closed series flow connection for supplying fluid to said rotor under pressure to rotate said propeller, said first lift rotor and said second lift rotor, a guide member confined on said guideway for movement therealong, and a connector between said guide member and said helicopter of a length sufficient to permit said helicopter to be raised above said guide member and lowered downwardly for loading purposes, said fluid flow producing means comprising a variable speed pump, control means for varying the output of said pump and the flow of fluid to said first, second and third rotors for varying the rotation of the propellers.

16. A helicopter guiding system, according to claim 15, wherein said control means includes a member carried on said connector and engageable on said guide way, and means on said guide way for actuating said connector for increasing and decreasing the output of said variable displacement pump.

17. A helicopter guiding system comprising, means defining a guide way adapted to be supported on the ground, a helicopter comprising a helicopter loading body, first and second lift rotors rotatably mounted for rotatation about substantially vertical axes at spaced locations on said helicopter body, at least one horizontal propulsion propeller rotatably mounted on said body for rotation about a substantially horizontal axis, a first fluid motor connected to said propeller for rotating said propeller, a second fluid motor connected to said first lift rotor for rotating said lift rotor, a third fluid motor connected to said second lift rotor for rotating said second lift rotor, fluid flow producing means connected to said first, second and third rotors for supplying fluid to said rotor under pressure to rotate said propeller, said first lift rotor and said second lift rotor, a guide member confined on said guide way for movement therealong, and a connector between said guide member and said helicopter of a length sufficient to permit said helicopter to be raised above said guide member and lowered downwardly for loading purposes, said fluid flow producing means comprising a variable speed pump, control means for varying the output of said pump and the flow of fluid to said first, second and third motors for varying the rotation of the propellers, said fluid flow producing means being carried on said guide member.

References Cited by the Examiner

UNITED STATES PATENTS

| 1,133,977 | 3/1915 | Lamb | 115—8 |
| 1,397,998 | 11/1921 | Zurovec | 244—17.17 |
| 2,514,822 | 7/1950 | Wolfe | 244—17.17 |
| 2,946,544 | 7/1960 | Kinney | 244—155 |

FOREIGN PATENTS

| 230,311 | 12/1909 | Germany. |
| 3,182 | 5/1914 | Great Britain. |

OTHER REFERENCES

Wingfoot Clan Goodyear Aerospace Corp., vol. 23, No. 6, Akron, Ohio, Thursday, March 12, 1964.

MILTON BUCHLER, *Primary Examiner.*

L. C. HALL, *Assistant Examiner.*